Jan. 15, 1957 R. WESSOLEK 2,777,808
REGENERATIVE COKE OVEN BATTERY
Filed Dec. 22, 1951 2 Sheets-Sheet 1
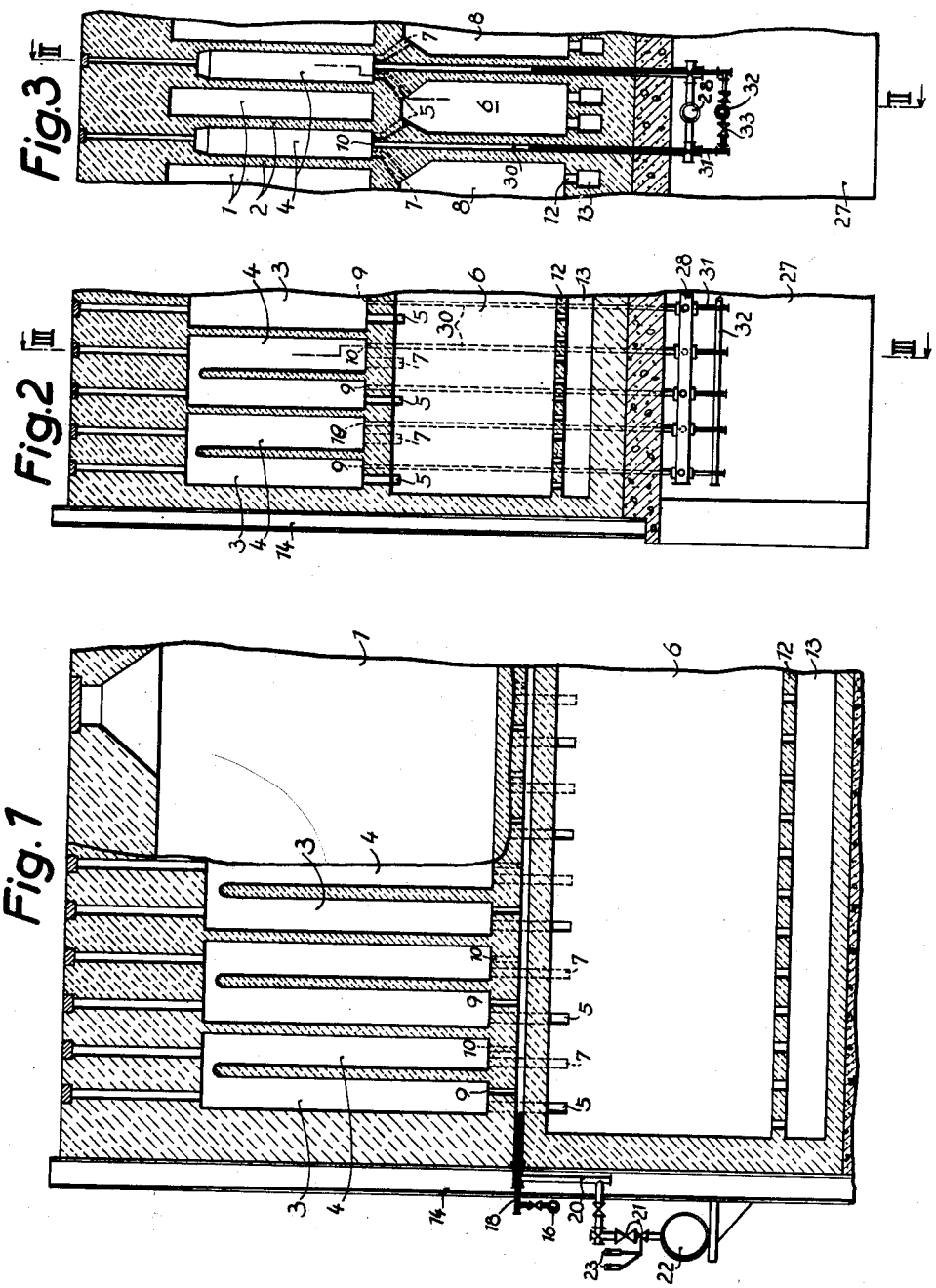
INVENTOR
RUDOLF WESSOLEK
BY
ATTORNEYS

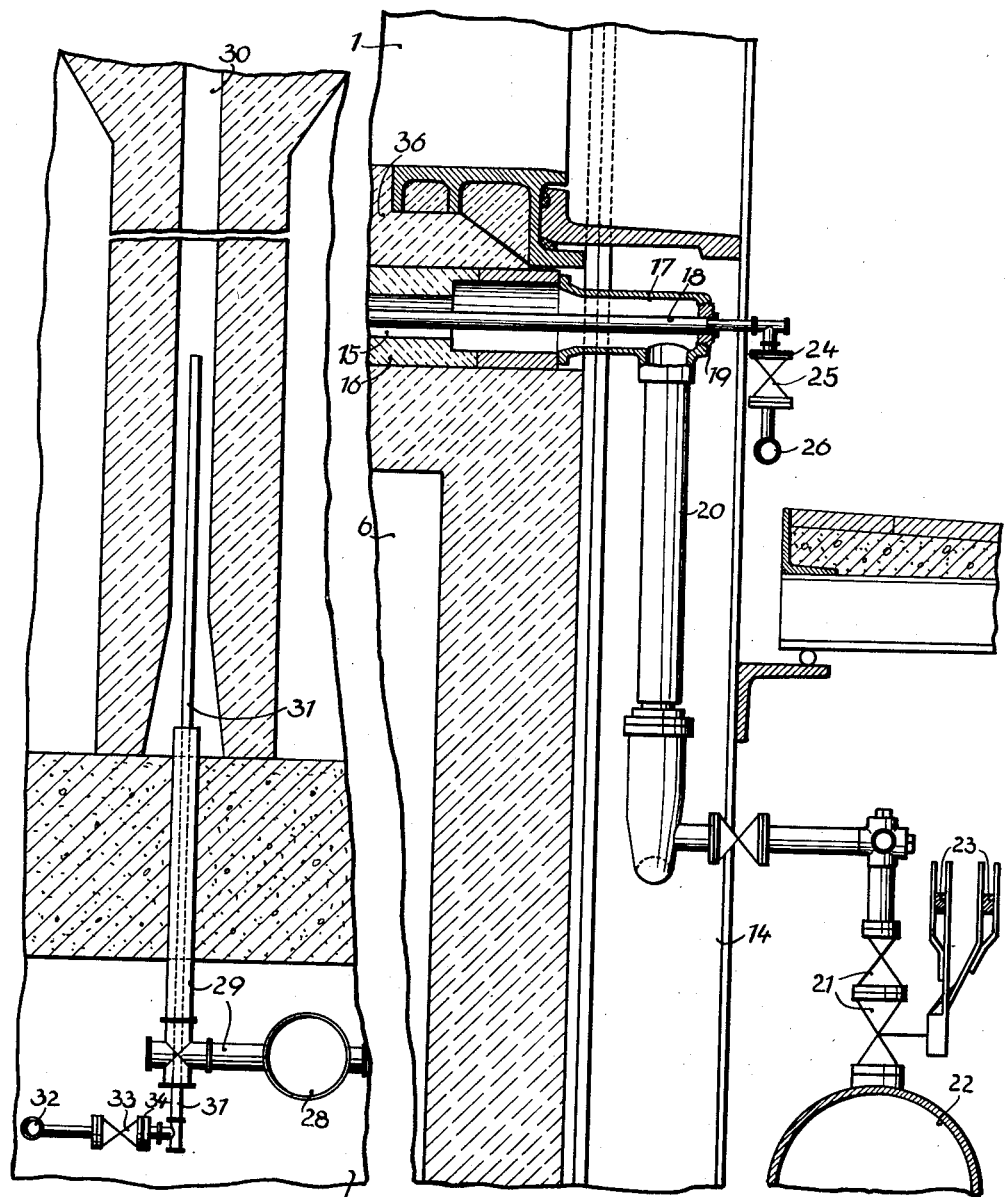

United States Patent Office 2,777,808
Patented Jan. 15, 1957

2,777,808
REGENERATIVE COKE OVEN BATTERY

Rudolf Wessolek, Gelsenkirchen, Germany, assignor, by mesne assignments, to Koppers Company, Inc., Pittsburgh, Pa., a corporation of Delaware Application December 22, 1951, Serial No. 262,967

6 Claims. (Cl. 202—139)

The present invention relates to chamber ovens, particularly horizontal chamber ovens, for the production of gas and coke using heating by rich gas, and refers more especially to chamber ovens of this nature in which regenerators are disposed beneath the coking chambers.

It is a known fact that rich gas, for example illuminating gas, which has a high hydrocarbon content, when it passes through heated conduits in the heating of coke ovens is subjected to certain decomposition reactions. Since comparatively high temperatures are encountered in the supply conduits arranged in the brickwork of the oven structure between the coking chambers and the regenerators, or in the walls between the regenerators, of coke ovens, in practice there is invariably pyrogenous decomposition of hydrocarbon substances in the rich gas used to heat coke ovens, causing depositing of graphite on the walls of the rich gas conduits and, in some cases, of the rich gas nozzles from which the gas flows into the heating conduits. The graphite formation is greater the lower the speed of flow of the rich gas.

To avoid the detrimental effect of these graphite deposits on the distribution of the rich gas, it is customary to conduct, into the rich gas conduits, air which provides for combustion of the graphite deposits during intermissions in the heating during the reversal of the regenerative phase. For this reason coke oven plants have been provided with so-called soot dampers which, after the rich gas supply has been shut down during the change over in the direction of heat flow, are opened so that air can then flow into the rich gas conduits.

The amount of graphite formation in the rich gas conduits varies with the quality of the heating gas, and there are instances where the soot dampers previously referred to give a more or less satisfactory result. In other cases, however, the formation of graphite from the rich gas is so considerable that the more frequent operation of the soot dampers called for results in considerable quantities of cold air entering the gas distribution conduits, and consequently produces detrimental under-cooling in the oven and thus an increase in the heat consumption resulting in an under-firing loss.

It has been proposed to mix with the rich gas, more particularly when this is a gas of a very high thermal value, a limited quantity of air for the purpose of effecting so-called de-lumination. On account of the danger of explosion, however, such mixing-in of air calls for special and expensive regulating devices, since otherwise detonations occur in the gas conduits. Such detonations have, moreover, to be taken into account when the soot dampers, or air inlet means of other kinds, which are operable on operation of the reversing valves of the rich gas conduits, are mechanically operated upon reversal of the direction of heating flow.

The object of the invention is to avoid the difficulties hereinbefore referred to, and to this end the de-luminating or de-sooting air is introduced, separately from the rich gas, into each rich gas conduit of the coke oven in a zone of the latter in which the temperature is higher than the ignition point of the gas-air mixture, whereby the air flowing into the rich gas conduit and mixing with the gas can immediately react without the production of large quantities of an explosive gas-air mixture whose ignition would develop explosions.

This main principle of the invention is preferably carried into effect by arranging air conducting tubes in the rich gas conduits at the outer ends of these latter, each of which tubes extends partway into the hot zone of the corresponding rich gas conduit, the annular space around each of these air supply tubes serving for the introduction of the rich gas and the tubes discharging the air at a region therein at which the temperature is higher than the ignition point of the air and gas mixture.

In a preferred embodiment the invention provides for the supply, to the air conducting tubes, or deluminating air under elevated pressure, advantageously continuously, that is to say both during the heating period, in which the rich gas conduit is flushed with combustible gas, and also during the reversal purge phase when the regenerative system is still in operation under draft but the supply of gas is interrupted to the rich gas conduits. In this form of the invention both a favourable de-lumination or cracking of the heavy hydrocarbons in the heating gas which are responsible for the formation of graphite, and also a continuous removal of any graphite deposits that should occur, are effected in a simple manner independently of the operating conditions and without prejudicial cooling down or other drawbacks.

Two embodiments of the invention are illustrated in the accompanying drawings in which:

Fig. 1 is a partial vertical section through part of an oven battery with horizontal rich gas conduits of the gas gun type.

Fig. 2 is a partial vertical section through part of an oven battery with vertical rich gas conduits of the under-jet oven type.

Fig. 3 is a vertical longitudinal section through part of an oven battery according to Fig. 2.

Fig. 4 shows the means for avoiding graphite deposits in oven batteries having vertical rich gas conduits, and Fig. 5 shows this means in oven batteries having horizontal rich gas conduits in an enlarged scale.

In Figs. 1–3 the oven chamber is designated 1 which is enclosed by heating walls 2. The heating walls form heating flues 3, 4 of which two are operated jointly when changing the direction of the heat flow. The heating flue 3 is charged during one heating phase with heating media by ports 5 and regenerator 6 and the heating flue 4 is used for discharging the waste gases through port conduits 7 to the regenerators 8. In heating with rich gas, preheated air from the regenerators 6 is introduced by the ports or regenerator ducts 5 into the heating flues 3 and rich gas through the burners 9.

After changing the direction of heat flow, the heating flues 4 are charged with heating media and the heating flues 3 exhaust the waste gas. Rich gas is then introduced through the burners 10 and air through the regenerator port conduits 7 from the regenerators 8 at the bottom of the heating flues. The waste gas is conveyed through the conduits 5 into the regenerators 6. The regenerators 6, 8 are connected by a distributor grate 12 with collecting and supply conduits 13 to which the gas is supplied and from which the waste gas is withdrawn to the stack, in alternation, through knee pieces not shown in the drawing. The complete oven brickwork is held together, in the usual way, by buckstays 14.

In Figs. 1 and 5 horizontal rich gas conduits 15 defined by former blocks 16 are arranged in the brickwork 36 between the coking chambers and the regenerators 6, 8. Projecting outwardly from the brickwork is a connecting pipe section 17 in which a tube 18 is concentrically arranged. The pipe section 17 has a lateral union 19 to which a gas supply pipe 20 is connected, this communicating through a reversing and regulating member 21 with a main gas conduit 22. The regulating member 21 is connected in known fashion with a reversing device 23 for changing over the direction of heat flow so that rich gas can flow from the main conduit 22 into the conduits 15 only during one operating phase, the "on" phase, of the regenerative system.

The tube 18 located in the rich gas conduit is used for the introduction of air, for which purpose it is connected to a compressed air conduit 26 through a throttle 24 and a shut-off valve 25, and extends to such a depth in the rich gas conduit 15 from the outer coolest side of the battery that its end is located in or near a zone in this conduit at which the temperature is above the ignition point of a gas-air mixture.

Advantageously the oven is operated so that a small amount of air flows permanently (continuously) through the tube 18 into conduit 15.

During the "on" operation period in which the rich gas conduit 15 is filled with gas being fed therethrough by conduit 22, the air mixes with the gas and reacts with the heavy hydrocarbon substances contained in the latter, as a consequence of the high temperature, thereby to produce light hydrocarbon substances and carbon monoxide, whilst the formation of elementary carbon compounds is suppressed. The amount of the air supply must of course be controlled so that no unwanted combustion in the true sense of combustion of the gas takes place in the rich gas conduit which would heat up the conduit, reaction solely with the hydrocarbon to produce light hydrocarbon being contemplated instead, by known limitation of the amount of air admitted through pipe 18 to react with such hydrocarbons.

The introduction of air through tube 18 into the rich gas conduit 15 can be continued during the other, "purge", operating period. Should carbon deposit from the rich gas have been formed at any point in the rich gas conduit or in the nozzles connected thereto, these will be continuously removed or burnt away by "decarbonization" as a result of the action of the inflowing air. As is known in this art, such carbon deposits do not begin to form in the outermost cooler portions of the conduits but only further along at the hotter regions where hydrocarbons are cracked.

In the form of construction illustrated in Figs. 2, 3 and 4 the rich gas is supplied from a horizontal distributor conduit 28 as associated with the various heating walls and arranged in a basement chamber 27 in the oven foundation, the gas passing through conduits 29 (one of which is shown), branching from conduit 28 and leading to each of the vertical rich gas conduits 30 in regenerator walls below the heating walls of the oven.

The vertical branch conduits 29 extend laterally until they are vertically beneath the appropriate vertical conduits 30 in the brickwork and each have an air supply tube 31 passing therethrough. These tubes 31 each extend into a zone in the corresponding rich gas conduit 30 above the bottom of regenerators 6, 8, at which the temperature is above the ignition point of the gas-air mixture, in a like manner to the air supply tubes 18 in Fig. 1.

The air for the removal of graphite in "purge" operation is supplied to the vertical branch conduits 31 from a horizontal distributing pipe 32 via a cut-off valve 33. The amount of air so introduced can be regulated by a replaceable throttle plate 34.

As will be evident, with an arrangement according to the present invention a detonation or explosion in the rich gas conduit is precluded, nor will there be any prejudicial lowering of the temperature in the conduit system, since only relatively small quantities of de-luminating or decarbonizing air are supplied at any time.

What I claim is:

1. Apparatus for introducing air for de-lumination of the heating gas or for removal of graphite in fuel gas passages of chamber ovens, comprising: horizontal chamber ovens for the production of gas and coke; heating flues for heating the coking chambers of the oven; rich gas conduits in the oven structure for feeding rich gas for combustion in the heating flues, said conduits extending from a region adjacent exterior surfaces of the oven inwardly to the heating flues; means for supplying rich gas for heating purposes and air in limited quantities to the rich gas conduits at said region adjacent exterior surfaces of the oven, characterized by the air admission inlets of said means being located inside each rich gas conduit at the rich gas admission end thereof, in the region thereof nearest the exterior surface of the oven and terminating for discharge of the air at an intermediate position therein, in advance of the outlet of said conduits to the heating flues, at which, during the operation of the oven, the temperature is above the ignition point of the gas-air mixture.

2. Apparatus as claimed in claim 1, and in which the air admission inlets comprise an air supply tube arranged in each rich gas conduit at its exterior end part and extending from the outermost portion thereof to the intermediate hot zone position thereof, said air supply tubes being spaced from the walls of their conduits to leave an annular space in the conduits around the air supply tube serving for the supply of the rich gas.

3. Apparatus as claimed in claim 2, and in which the air supply tubes in the various rich gas conduits are connected to a common conduit for the distribution thereto of compressed air through regulator means.

4. Apparatus as claimed in claim 3, and in which shut-off valve means are arranged between the common distribution conduit and each air supply tube.

5. Apparatus as claimed in claim 2, and in which the rich gas conduits are of the conventional horizontal gas gun type.

6. Apparatus as claimed in claim 2, and in which the rich gas conduits are of the conventional underjet rich gas riser duct type.

References Cited in the file of this patent

UNITED STATES PATENTS

| | | |
|---|---|---|
| 1,166,451 | Dreffein et al. | Jan. 4, 1916 |
| 1,410,783 | Van Ackeren | Mar. 28, 1922 |
| 1,704,239 | Becker | Mar. 5, 1929 |
| 1,901,770 | Petsch | Mar. 14, 1933 |
| 1,918,926 | Otto | July 18, 1933 |
| 2,302,728 | Wethly | Nov. 24, 1942 |
| 2,306,366 | Becker | Dec. 29, 1942 |
| 2,346,991 | Otto | Apr. 18, 1944 |
| 2,388,438 | Otto | Nov. 6, 1945 |
| 2,426,520 | Otto | Aug. 26, 1947 |

FOREIGN PATENTS

| | | |
|---|---|---|
| 588,507 | Germany | Nov. 23, 1933 |